United States Patent [19]

Gnanamuthu et al.

[11] 4,015,100
[45] Mar. 29, 1977

[54] SURFACE MODIFICATION

[75] Inventors: Daniel S. Gnanamuthu, Weymouth; Edward V. Locke, Rockport, both of Mass.

[73] Assignee: Avco Everett Research Laboratory, Inc., Everett, Mass.

[22] Filed: Sept. 8, 1975

[21] Appl. No.: 611,628

Related U.S. Application Data

[63] Continuation-in-part of Ser. No. 431,240, Jan. 7, 1974, abandoned.

[52] U.S. Cl. .......................... 219/121 LM; 219/76
[51] Int. Cl.[2] .................................. B23K 26/00
[58] Field of Search ... 219/121 L, 121 LM, 121 EB, 219/121 EM, 121 P, 76, 137; 29/156.7 R, 156.7 A; 148/3, 4, 6, 13

[56] References Cited
UNITED STATES PATENTS

| | | | |
|---|---|---|---|
| 3,349,463 | 10/1967 | Kittelson | 29/156.7 R |
| 3,362,057 | 1/1968 | Kubera et al. | 29/156.7 R |
| 3,461,001 | 8/1969 | Kubera | 29/156.7 R X |
| 3,632,398 | 1/1972 | Konig | 219/121 LM X |
| 3,649,380 | 3/1972 | Tauschek | 29/156.7 A |
| 3,673,374 | 6/1972 | Hauck | 219/76 |
| 3,743,777 | 7/1973 | Hanus et al. | 219/121 LM |
| 3,773,565 | 11/1973 | Pye et al. | 219/121 EB X |
| 3,802,927 | 4/1974 | Gomada | 219/121 L X |
| 3,806,692 | 4/1974 | Few | 219/121 EM |
| 3,819,901 | 6/1974 | Berinde et al. | 219/76 |
| 3,848,104 | 11/1974 | Locke | 219/121 L |
| 3,850,698 | 11/1974 | Mallozzi et al. | 219/121 L X |
| 3,925,116 | 12/1975 | Engel | 219/121 P X |
| 3,952,180 | 4/1976 | Gnanamuthu | 219/121 LM |

FOREIGN PATENTS OR APPLICATIONS

2,173,303 5/1973 France .................... 219/76

OTHER PUBLICATIONS

L.I. Mirkin, *Doklady Akad. Nauk SSSR*, "On the Possibility of Impregnating Iron with Carbon by the Action of a Laser Light Pulse" 219–276.
I.V. Gasuko et al., "Sintering of Powders and Chemical–Heat Treatment of Metal Surfaces with Laser–Beam Heating" 219–276.
Mirkin, "Laser Beam Promoted Saturation of Iron by Tungsten" 219–276.

*Primary Examiner*—J. V. Truhe
*Assistant Examiner*—Clifford C. Shaw
*Attorney, Agent, or Firm*—Charles M. Hogan; Melvin E. Frederick

[57] ABSTRACT

Properties of a surface layer of a metal part are modified by changing its composition and microstructure using focused radiant energy. Minor components of an alloy having the metal of the substrate as the major component thereof are applied to the surface and a limited depth surface layer of the substrate metal is melted, the coated-on components are mixed therewith and the mixture is rapidly cooled to produce a desired surfacing alloy to a controlled depth within the substrate and having a fine grained microstructure compared to the microstructure of the substrate metal. The amount of coated-on minor alloy components and the preselected depth of melting of the substrate metal provide alloy composition control. The melting is carried out by application of focused radiant energy using a laser, preferably applied in a manner to promote mixing of the coated-on minor alloy components and the molten substrate layer during the short time, on the order of tenths of a second, of molten state maintenance for any given surface area.

9 Claims, 29 Drawing Figures

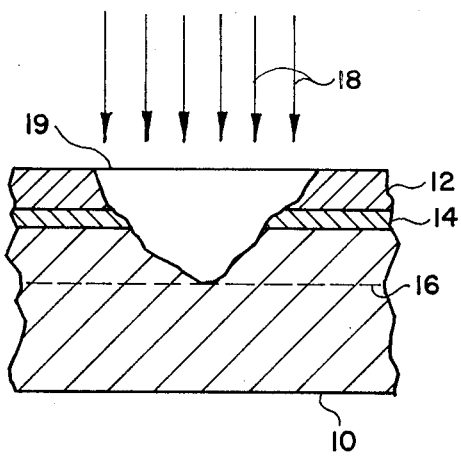
FIG. 1
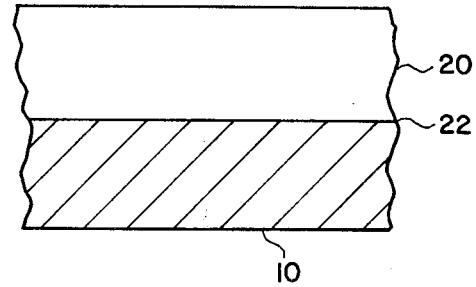
FIG. 2
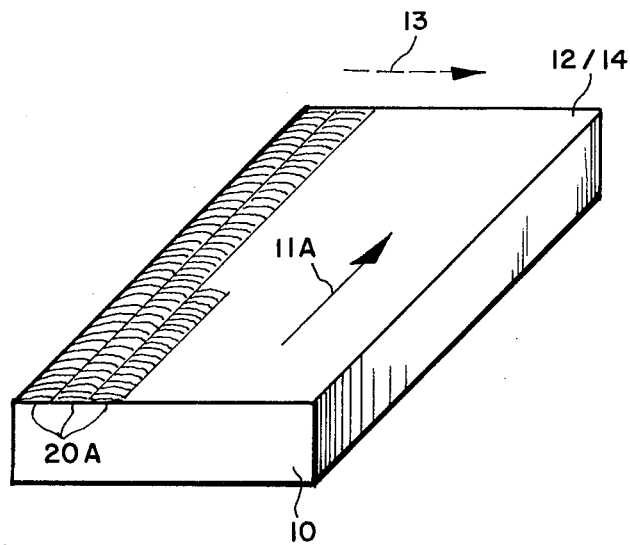
FIG. 4
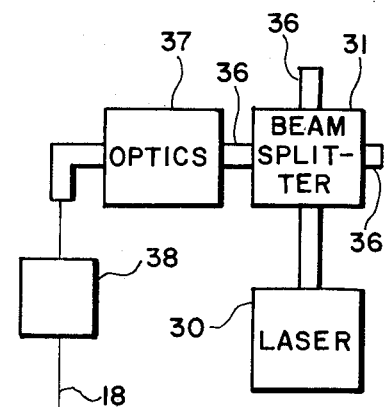
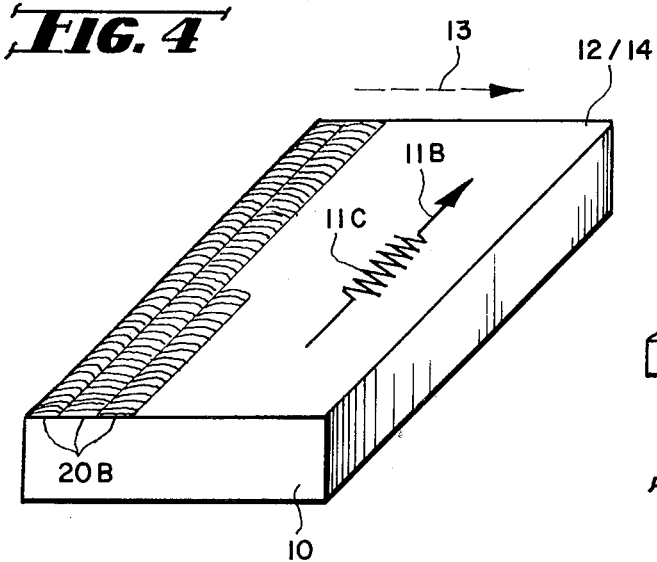
FIG. 5
FIG. 3

(MAGNIFICATION 3500 X)
.002" BELOW THE SURFACE (MAGNIFICATION 200 X)

(MAGNIFICATION 3500 X)
.003" BELOW THE SURFACE (MAGNIFICATION 3500 X)
.005" BELOW THE SURFACE (MAGNIFICATION 3500 X)
.004" BELOW THE SURFACE

SURFACE MODIFICATION

CROSS-REFERENCE TO RELATED APPLICATIONS

This is a continuation-in-part of our co-pending Ser. No. 431,240, filed Jan. 7, 1974 and now abandoned.

BACKGROUND OF THE INVENTION

The present invention relates to surface modification of fabricated or semifabricated parts and more particularly to producing changed physical or chemical properties on metal, e.g. hardened surfaces.

There are many known and long practiced methods for improving the resistance of fabricated or semifabricated metal (including elements, alloys and compounds) to wear, galling, deformation, corrosion, heating and/or erosion. These include overcoating the surface of the metal and modification of the composition and/or microstructure of the surface through such techniques as carburizing, nitriding, siliconizing, diffusion hardening, hard surfacing (welding a high-alloy layer to the surface), flame hardening, induction hardening and physical modification (e.g. peening). The overcoating methods include electroplating chromium or nickel on to the surface, plasma spraying or flame spraying refractories on to the surface and roll cladding (for sheet form or wire form mill products).

The state of the art with respect to the commercial methods in most widespread commercial use for such purposes is given in the report, "Hard Facing by Arc Welding", by the American Society for Metals, Committee on Hard Facing, appearing in the Eighth edition of the ASM Metals Handbook at pages 152–166. This describes the application of oxyacetylene welding, shielded metal-arc welding, open-arc welding, gas tungsten-arc welding, submerged-arc welding and plasma arc welding, to hard facing, including description of the form of hard facing alloy (rod, powder, wire), weld metal dilution ratios, (varying from 1 to 10 for oxyacetylene, 10 to 30 for most of the other methods, but as high as 60 for submerged-arc welding), and other parameters. Related information is given in U.S. Pat. No. 3,678,374 to Hauck, assigned to Union Carbide Corporation and in the article by Union Carbide Corporation by Zuchowski and Gerrabrant, "New Developments in Plasma Arc Weld Surfacing", Welding Journal, vol. 41, No. 6, pp. 548–555 (1962) and in U.S. Pat. No. 3,819,901 to Berinde, et al. It is a common problem of such methods that the costly hard facing alloy must be pre-prepared and used in excessive quantities because of the need to establish minimum thicknesses for effective deposition and to grind down the hard facing coating to final dimension. The substrate part which is hard faced is often undesirably affected through incidental heat treatment as a result of the hard facing process. All such methods involve dilution of hard facing material and establish composition of resultant surface in less controlled manner than is desirable. All such methods are also relatively intolerant of geometry since they involve placing arc torches or electrodes adjacent the region to be filled and in that the precision of the close spacing is critical.

It has been proposed to melt the surface layer of a metal substrate by electron beam impingement to react with a coating material to form a hard surface of exceptional adhesion properties in the proceedings of the Apr., 1966 Conference on "Electron and Ion Beams Science and Technology" of the American Institute of Mining, Metallurgical and Petroleum Engineers (Vol. 51, Metallurgical Society Conference, page 605). Electron beams tend to drill through and provide deep penetration characteristics when applied at power density levels sufficient for rapidly melting a surface layer but may be defocussed to limit deep penetration. However, such beams tend to charge a coating of metal or other conductive particles negatively and, through repulsion between such particles themselves the coating particles would be scattered from the surface before a substantial portion of the reaction could occur. Electron beam technology is also limited by the need for ambient vacuum or very close spacing between a work piece and an exit orifice of an out-of-vacuum electron beam system since ambient air will scatter an electron beam.

It has also been proposed to accomplish hard facing by coating a substrate surface and applying the beam of a pulsed ruby laser to melt the surface layer in the article by Schmidt, "Tools and Engineering Materials with Hard Wear-Resistant Infusions", Journal of Engineering for Industry 549–552 (August, 1969). Surface alloying using a pulsed semiconductor laser is proposed in articles by Mirkin and Gazuko at Doklady Akad. Nauk SSSR, May 11, 1969, Volume 186, No. 2, pages 305–308 (an English translation appearing in Soviet Physics — Doklady, Volume 14, No. 5, pages 494–496 of 1969) and in Poroshkovaya Met. of January 1974, Part 1, pages 27–30. The Schmidt proposal results in a composite of tungsten carbide in a matrix of substrate sub-surface material (typically iron). None of the Schmidt, Mirkin and Gazuko articles describe commercially implemented processes. The limitations of these proposals may be understood by the context of the art given in the exhaustive review article by Gagliano, et al, "Lasers in Industry", Proceedings of the Institute of Electrical and Electronic Engineers, Volume 57, No. 2, 1969, pages 114–147.

Pulsed semiconductor lasers applied along a linear work path produce a series of shallow craters and a rough undesirable product surface. After grinding to smooth such a surface, the alloy layer may be removed in part.

It is an important object of the present invention to provide an improvement in metal wear resistance protection and related arts in respect of extending the method capabilities of such art(s) and/or producing improved products.

It is a further object of the invention to convert a surface layer on a substrate to a form in which it is highly adherent to the substrate material consistent with the preceding object.

It is a further object of the invention to convert a surface layer on a substrate to a wear resistant form which includes a significant proportion of the substrate as a separate and distinct phase and/or as a constituent of a newly formed compound, consistent with the preceding objects.

It is a further object of the invention to convert a surface layer on a substrate to a wear resistant form made by melting and mixing the surface layer with alloying and/or reactive materials in a very short time, consistent with the preceding objects.

It is a further object of the invention to deal with irregularly shaped materials consistent with one or more of the preceding objects.

It is a further object of the invention to provide chemical modification of surfaces consistent with one or more of the preceding objects.

It is a further object of the invention to provide high density, low porosity surface layers consistent with one or more of the preceding objects.

It is a further object of the invention to utilize standard equipments borrowed from other major purposes and not necessarily dedicated to surface modification consistent with one or more of the preceding objects.

It is a further object of the invention to provide surface layer treatment which is tolerant of difficult geometries, including re-entrants and remote surface regions, consistent with one or more of the preceding objects.

It is a further object of the invention to provide surface layering, without regard to electrical or magnetic field conditions which may exist in the region or surface to be treated or which may develop in the course of processing, consistent with one or more of the preceding objects.

It is a further object of the invention to utilize low cost materials, with respect to initial selection and quantity and in limitation of quantity of usage, consistent with one or more of the preceding objects.

It is a further object of the invention to minimize the costs in labor, materials and/or time of ancillary machining and/or heating steps related to surface layering, consistent with one or more of the preceding objects.

It is a further object of the invention to provide controlled dilution of alloying material and/or establish alloy composition with a high degree of control, consistent with one or more of the preceding objects.

It is a further object of the invention to provide flexibility of process control consistent with one or more of the preceding objects.

It is a further object of the invention to minimize incidental effects on the substrate below the surface layer consistent with one or more of the preceding objects.

It is a further object of the invention to provide areally homogeneous surface layers at any given depth in respect of composition and/or microstructure consistent with one or more of the preceding objects.

It is a further object of the invention to provide minimal working time and related substrate preparation and posttreatment times consistent with one or more of the preceding objects.

SUMMARY OF THE INVENTION

According to the invention, a substrate part is coated with minority ingredients to be introduced into a preselected surface layer depth of the substrate to form an intimate mixture and/or compounds therewith wherein the substrate material in said layer comprises a significant weight percent, preferably in the range of 10–80 weight percent, of the mixture. The coating may be supplemented or replaced by other defined reservoirs of minority ingredients.

The surface layer of a substrate is melted to the preselected depth, preferably through application of a focused beam of radiant energy to limited surface area regions on the order of 0.025 to 0.7 sq. inches and relative scanning of the radiant energy beam and surface to sequentially melt and resolidify a series of such areas as a continuous line pattern melted and resolidified to an essentially constant depth and width under essentially uniform conditions throughout the linear scan, to define a desired pattern of surface modification. The conditions of melting are controlled to induce forced mixing of the coating material with the molten substrate material to the extent that mass transfer through such mixing is predominant over diffusion in the molten surface layer region. Any such region is maintained at molten state for less then 10 seconds, preferably less than 1 second, and the substrate provides a very large heat sink to the molten region(s) to assure rapid solidification upon removal of the impacting energy beam. The high rates of cooling during laser melt quenching, comparable to that obtainable heretofore only by splat cooling techniques, are discussed further in the article by Eliot, et al, "Rapid Cooling by Laser Melt Quenching", at Applied Physics Letters, volume 21, No. 1, pages 23–25, July 1972. However, the art understands limitations to any quantitative treatment of the subject due to such phenomenon as porosity artificially generated through vaporization of low boiling point constituents of an alloy metal, as discussed for instance at page 123 of the above cited Gagliano et al reference.

The process is preferably conducted at atmospheric or superatmospheric pressure to suppress volatilization of mixture ingredients and to avoid the fixturing, cleanliness and setup time requirements of vacuum processing.

According to a further aspect of the invention, the transitory zone of energy application for melting may be oscillated locally at 100 to 1000 Hertz to further promote mixing of ingredients. Such oscillation may comprise local sweeping of a radiant energy beam and/or modification of the beam contour such as switching between rectangular and round beam shapes.

The present invention utilizes CW laser equipment and processing techniques described in U.S. Pat. Nos. 3,702,973, 3,721,915, 3,810,043, 3,713,030 and 3,848,104, all of common assignment with present application, said last mentioned U.S. Pat. No. 3,848,104 describing utilization of the equipment in a metal surface heat treatment process which can be conducted in tandem with the same process or as available alternative processes utilizing the same equipment.

Through the process of the present invention, a part can be fabricated from a base metal selected on the basis of cost and/or chemical properties and a working surface thereof can be modified to provide necessary characteristics required in a particular application, e.g., high temperature hardness, strength or ductility; wear resistance; corrosion resistance, etc. Since a variety of elements can be alloyed into the base metal substrate at alloy concentrations in excess of 50 weight percent if needed, freedom in part design can result in substantial product improvements and cost reductions. For example, if a part is subject to impulsively delivered mechanical loads, it must be made of a very tough, crack resistant material such as AISI 4815 steel. However, if that same part has a bearing surface that must be very hard to resist wear, particularly at elevated temperatures, surface chemistry can be modified in accordance with the process of the present invention to provide an alloy limited as to melt layer depth which can be solidified to provide a hardness value of Rockwell C 55, as compared to C-30 for the base material. The alloy would be produced by adding 21 weight % chromium and 2 to 3.5 weight % carbon in the surface layer. Since a melted surface layer cools very rapidly, the resulting dendritic structure is quite fine and contains chromium carbide in the inter-dendritic regions. This type of structure retains its hardness quite well, even at elevated temperatures.

This is exemplary of a variety of product treatments which can be applied on-line at high production rates rather than employing a long off-line processing technique, such as carburizing or other gas phase treatments or rather than applying any of the above-mentioned weld surfacing processes with their attendant high labor costs, clean up and thermal distortion problems, or plasma spraying with its attendant production of porous coating.

The process of the present invention produces an alloy casing microstructure whose secondary dendritic structure exhibits spacings (as determined by measurement on a polished cross-section viewing the thus produced two dimensional projection of a three dimensional crystallographic specimen) of 1–100 microns, and typically 10–15 microns. This is in contrast to the less than 0.5 micron spacing which would be typically produced in a semiconductor pulsed laser processed product according to the above described disclosures of such alloy processing or the 200 or more micron spacing produced in many alloy casting processes. Similar secondary dendrite spacings can, however, be produced in hard face coatings. The process of the present invention further produces a controlled dilution of alloying elements in the range of from 0.01:1.0 to 0.81:1.0 (by weight). The depth of melt in accordance with the present invention is 2–200 mils compared to a fraction of a mil thickness produced in the above Mirkin process. The low depth of heat affected zone in the substrate under the alloy casing further characterizes resultant products of the process of the present invention and the process itself. The process is further characterized by the conditions of linear trace relative movement between CW laser beam and substrate surface at 5–500 inches per minute focusing 1–20 kilowatts of essentially level power into a 0.025 to 0.7 inches diameter circle or areal equivalent of other form.

These and other objects, features and advantages of the invention will be apparent from the following detailed description with reference therein to the accompanying drawings in which:

BRIEF DESCRIPTION OF THE DRAWINGS

FIG. 1 is a cross-section sketch of a sheet form substrate part at an early stage of surface modification in accordance with the present invention;

FIG. 2 is a similar section view of the part after completion of modification in accordance with the present invention;

FIG. 3 is a diagrammatic sketch of a preferred apparatus arrangement for practice of the present invention;

FIGS. 4 and 5 are isometric views of parts undergoing surface modification in accordance with two embodiments of the present invention;

DETAILED DESCRIPTION OF PREFERRED EMBODIMENTS

Figure 6A:
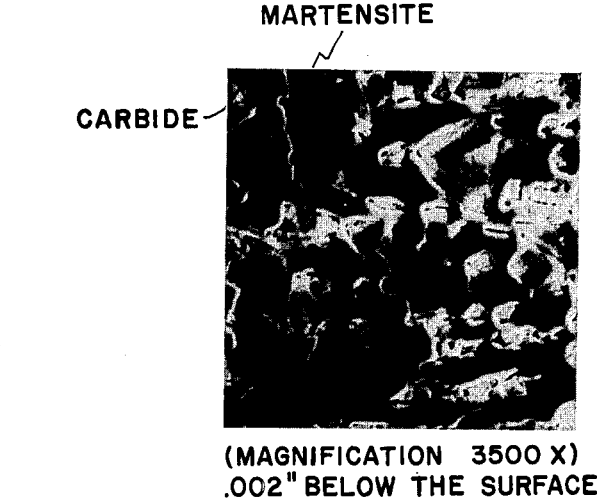
FIGS. 6 and 6A–6D are photomicrographs of cross-sections of a substrate subjected to surface modification in accordance with the present invention.

Referring now to FIG. 1 there is shown a substrate metal part 10 which may be a mill product such as a steel sheet or a fabricated part such as a steel valve seat. In order to increase the wear resistance of its upper surface, a layer of minority ingredients (e.g. chromium and manganese) for converting a surface layer of the part to high alloy composition is coated thereon. A preselected depth line 16 is established below the surface of the part 10 to define a surface layer and an amount of the substrate metal which, together with the minority ingredient(s) coating 12, will form the desired alloy. An energy absorbing layer 14 may be placed on the substrate part as an undercoat for the coating 12 or admixed with the coating 12. A beam of radiant energy 18 is provided from a suitable source such as a laser to produce a molten zone 19 down to depth line 16 and through relative displacement of the substrate part 10 and beam 18, the molten zone is scanned with linear continuity or skips as desired to form a time sequence array of such molten zones. During the maintenance of molten zone 19 in any given point, heat transferred therefrom to the large heat sink provided by the substrate part 10 is very rapid and as soon as the impacting beam 18 is relatively displaced therefrom, the molten zone cools and solidifies.

Preferably, for treating metals, a 1–20 kilowatt laser beam focused to a 0.025 to 0.07 inch diameter circle, or areal equivalent of other form, is scanned across the surface to be modified at a rate of 5–500 inches per minute. Typical times of residence in the molten state for any given region of surface layer are 0.1 to 1.5 seconds and cooling time for the molten region to below the applicable solidus temperature for the alloy composition therein is typically 0.1 to 1.5 sec. During the melting, thermal gradients alone induce a substantial degree of mixing of the minority ingredients of the coating with the molten surface layer portion. Additionally, it is believed that a pressure wave is induced by the high energy input and this pressure wave further promotes vigorous mixing. Such mixing can be further substantially enhanced by local oscillation of the energy impact as described below in connection with FIGS. 4 and 5.

Faster scanning rates are possible where the substrate is preheated. See Example 7.

Referring now to FIG. 2 there is shown a substrate part 10 with hardened surface layer casing 20 and an interfacial layer 22. The thickness of layer 20 is to a depth coinciding essentially with the preselected depth line 16 (FIG. 1).

Referring now to FIG. 3, there is shown an apparatus arrangement for practice of the invention. The workpiece 10 is placed on a conventional milling machine base having ways and traversing controls for displacing the workpiece in orthogonal directions as indicated by the double headed arrows 11 and 13. Such x and y traverses may be simultaneous or one of them may be intermittent.

The radiant energy beam 18 for working as described above in connection with FIG. 1, is provided by a laser 30. The laser can be of the type shown in U.S. Pat. Nos. 3,721,915, 3,702,973, 3,577,096, and 3,713,030, the disclosures of which are incorporated herein by reference as though set out at length herein. The laser 30 in FIG. 3 is coupled to beam splitter 31. One or more beam tunnels 36 exiting from the beam splitter 31 are used to divert the laser beam to one or more points of application and the beam may be time-shared among such applications very quickly, and even multiplexed, using tiltable mirror means and rotating beam chopper wheels. Mirror means indicated schematically at 33, may be provided in adjustable form to receive the laser beam from the optics module 37 for producing a sweep of beam 18 as a supplement to or in lieu of workpiece displacement on table 39 and for the local oscillation purposes described below in connection with FIG. 5.

Such optics modules of the laser beam defining equipment comprise telescope means with a depth of focus varyig from about $f/10$ to $f/150$ for alloying and $f/100$ to $f/300$ for heat treating in some applications.

Referring now to FIGS. 4 and 5 (isometric views of a workpiece 10 being processed in accordance with the invention, using the apparatus of FIG. 3), the workpiece has the coating 12/14 thereon as described above in connection with FIG. 1. The workpiece is displaced relative to the beam in a longitudinal scanning direction indicated by arrow 11A in FIG. 4 and arrow 11B in FIG. 5 and intermittently displaced as indicated by arrow 13 in FIGS. 4 and 5 to produce a series of adjacent lines.

One of the beam tunnels 36 is coupled to an optics module 37 where the laser beam is configured for heating a substrate.

The beam is switched off during retrace or alternatively may be kept on to do adjacent lines (20A in FIG. 4 or 20B in FIG. 5) during a pass and retrace. The beam may also be switched off to allow skipping surface area regions of the coating 12/14 to form a desired pattern of hard surfaced and non-hard surfaced areas.

The relative displacement traverse indicated by both of arrows 11A and 11B in FIGS. 4 and 5 respectively, is typically done at a relative scan rate of about 20 inches per minute. However, there may be superimposed on the scanning in FIG. 5 a local lateral oscillation of the beam relative to the scan direction as indicated by the oscillating wave form 11C superimposed on arrow 11B. The working spot size would typically coincide with the full width of lines 20A in the first processing mode indicated in FIG. 4 and be substantially less than the full width of lines 20B in the second processing mode in FIG. 5 and in the latter case the oscillations of the spot relative to the surface of part 10 would provide full line coverage while producing repeated bursts of energy input to the same surface area region thereby substantially promoting mixing of the molten surface layer of part 10 with the locally melted portion of coating 12. Such gradients can also be induced with a large spot size of focused energy having the same width as line 20B through continual changes of the areal configuration of the spot, such as switching between linear and circular forms or between circular and star shaped forms. Longitudinal oscillations of beam center may be used in addition to or in lieu of lateral oscillations.

The practice of the invention is further illustrated by the following non-limiting examples.

EXAMPLE 1

Mixtures of metal powder were coated on the surfaces of metallic products by spraying. The coated surfaces were scanned by a high powered laser beam causing the surface and the powder to melt and alloy uniformly. By this process, the hardnesses of the melted zones were found to be increased substantially. In one test, the surface of AISI C 1018 steel was coated with a 174 to 178 mil layer of manganese phosphate by a commercial manganese phosphating process. This optional coating of manganese phosphate facilitates absorption of a laser beam. Other possible choices of heat absorbing material are zinc phosphate, aluminum oxide, and carbon black. The choice will also depend on the wavelength of the heat source. Then, a mixture containing 6 grams of 45 micron sized carbon powder, 3 grams of 10 micron sized chromium powder, and 3 grams of 45 micron sized manganese powder suspended in 40 milliliters of isopropyl alcohol was sprayed uniformly over the manganese phosphate coating. The thickness of the loosely packed powdered metal coating was 178 mil. The surface of the steel containing the mixture of metal powder was scanned at 20 inches per minute under 11–11.5 killowatts dithered (locally oscillated) laser beam. The laser beam size was 01 inches by 0.5 inches in a rectangular configuration and being elongated perpendicular to the direction of traverse because of local oscillation being performed along this direction to cover the complete line width (20B, FIG. 5). The oscillation rate was 690 Hertz. Under these conditions, the surface of the steel melted and uniformly alloyed with the carbon, chromium, and manganese powder. The hardness of the melted and resolidified zone was in excess of Rockwell C58 up to a depth of 5 mils, while that of the steel was Rockwell B93.

Figure 6:
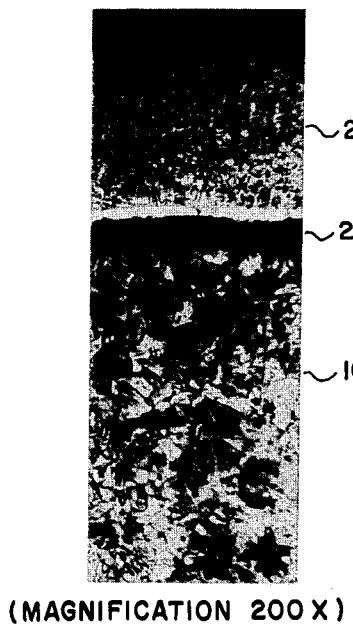
Figure 6B:
Figure 6D:
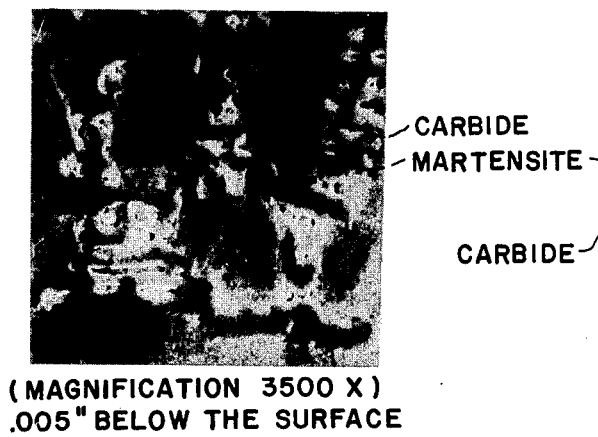
Figure 6C:
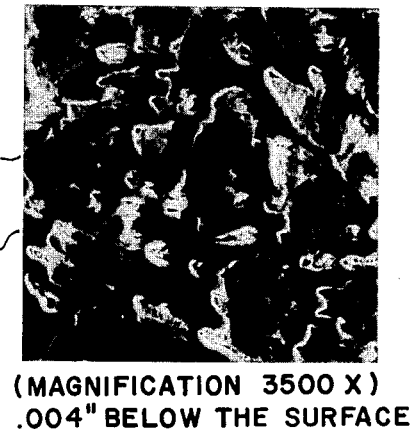

FIG. 6 is a 200 times magnified photomicrograph of a workpiece treated in accordance with this Example 1 above and FIGS. 6A, 6B, 6C, 6D are 3500 times magnification scanning electron microscope photomicrographs of small regions at depths of 2, 3, 4 and 5 mils, respectively, below the surface of the workpiece of the region shown in FIG. 6.

Referring first to FIG. 6, the unaffected substrate is indicated at 10, the alloyed surface layer thereof at 20 and interfacial layer 22 defines an inner boundary between surface layer 20 and substrate 10. Layer 20 has a finer grain structure than the substrate. FIGS. 6A–6D reveal a two-phase structure in layer 20 of martensitic dendrites surrounded by carbides in the interdendritic regions.

Figure 7:
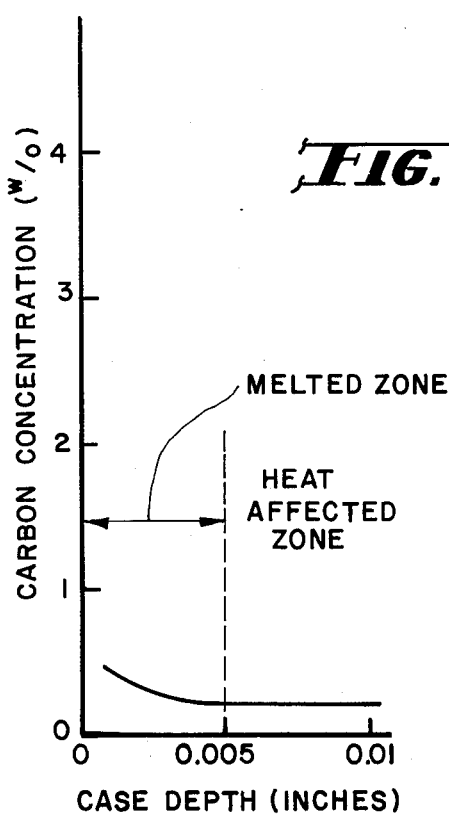
FIGS. 7–9, 11, 12, 15 and 19 are concentration vs. case depth curves for minority ingredients introduced into the surface layer of workpieces modified in accordance with the invention.
Figure 8:
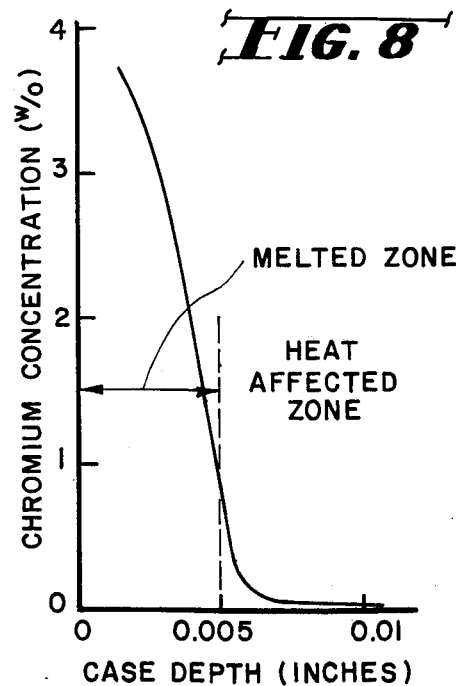
Figure 9:
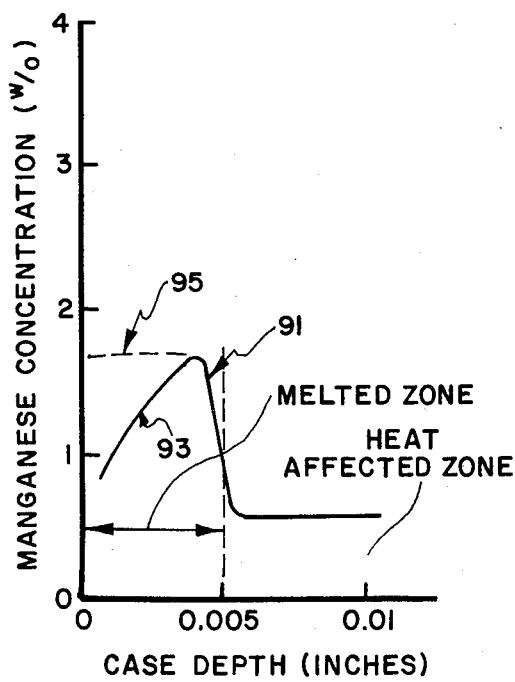

FIGS. 7, 8 and 9 show minor alloy ingredient concentration in the finished product for carbon, chromium, and manganese, respectively, produced by processing in accordance with Example 1. The curves of FIGS. 7, 8 and 9 are plots of concentration of the respective minor alloy component against case depth. These curves are fitted to original data points in accordance with conventional statistical practice. These curves show an increase in the minority ingredients of the ferrous alloy composition. The depression at portion 93 of curve 91 (FIG. 9) reflects volatilization of manganese at the surface; in the absence of volatilization, the curve portion would be indicated in dashed lines at 95 or somewhat higher. If the case depth is much deeper (see Example 7), then the surface effect becomes less significant.

Figure 10:
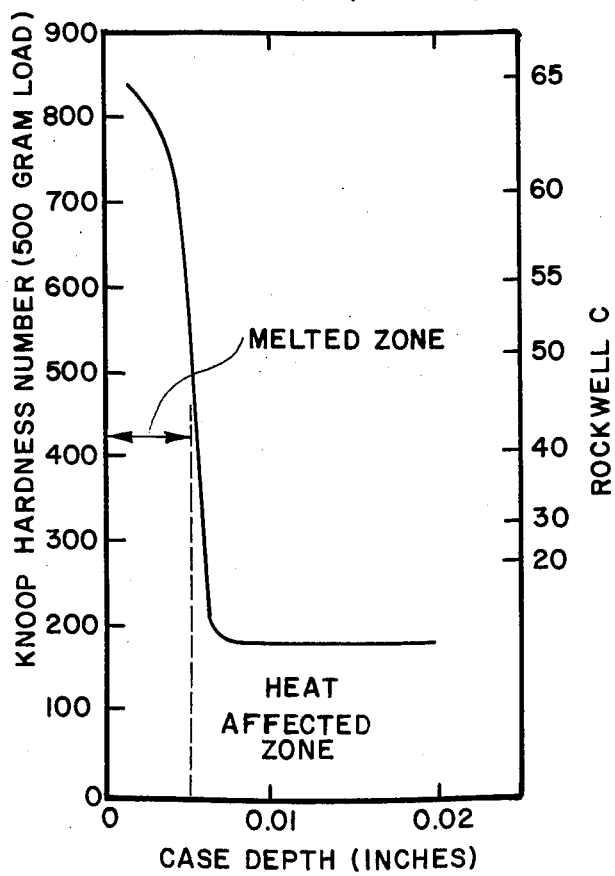
FIGS. 10, 13, 14, 16–18 and 20–21 are hardness vs. case depth curves for surface layers of workpieces modified in accordance with the invention.

FIG. 10 shows hardness profiles in the finished product subjected to laser working with local oscillation. The melted zone was 5 mils deep and in this zone the hardness was Rockwell C58 to 63, while the hardness value for the heat affected zone in the steel was Rockwell B90, and the hardness value for the core of the steel was Rockwell B93. The depth of the heat affect zone was approximately 0.05 inches.

EXAMPLE 2

The surface of AISI C 1018 plate was coated with a ¼ to ½ mil. Layer of manganese phosphate by a commercial manganese phosphating process. A small portion of the mixture containing 10 grams of 45 micron-sized aluminum powder suspended in 50 milliliters of isopropyl alcohol was uniformly brushed on to the manganese phosphate surface. Aluminum powder was applied to prevent gas evolution during melting. Then a mixture containing 12 grams of 45 micron-sized carbon powder, 6 grams of 10 micron-sized chromium powder, and 6 grams of 45 micron-sized manganese powder, suspended in 40 milliliters of isopropyl alcohol was sprayed 20 times uniformly over the aluminum powder coating. The thickness of the loosely packed metal powder coating was 15 to 20 mils.

The coated surface was then subjected to laser working of separate specimens thereof in the fashions disclosed in connection with FIGS. 4 and 5, respectively, above. That is, one surface was hardened by melting down to a limited layer to intermix minor ingredients of an alloy with a major ingredient derived from the substrate without local oscillation and other specimens were so treated with oscillation. In both modes, the melting time for any given surface area was 0.3 seconds and the power output from the laser was 13–14 kilowatts. In the work without local oscillation, the traverse speed was 50 linear inches per minute and in the work with local oscillation, the traverse speed was 20 inches per minute. Average power density applied in melting in both cases was 250–300 kilowatts per square inch of work piece surface area. In the non-local oscillation work, the beam size of the impinging laser beam was 0.25 inches and in the local oscillation work, the beam size was 0.1 inches by 0.5 inches in a rectangular configuration and being elongated perpendicular to the direction of traverse because of local oscillation being performed along this direction to cover the complete line width (20B, FIG. 5). The oscillaton rate was 690 Hertz.

Figure 11:
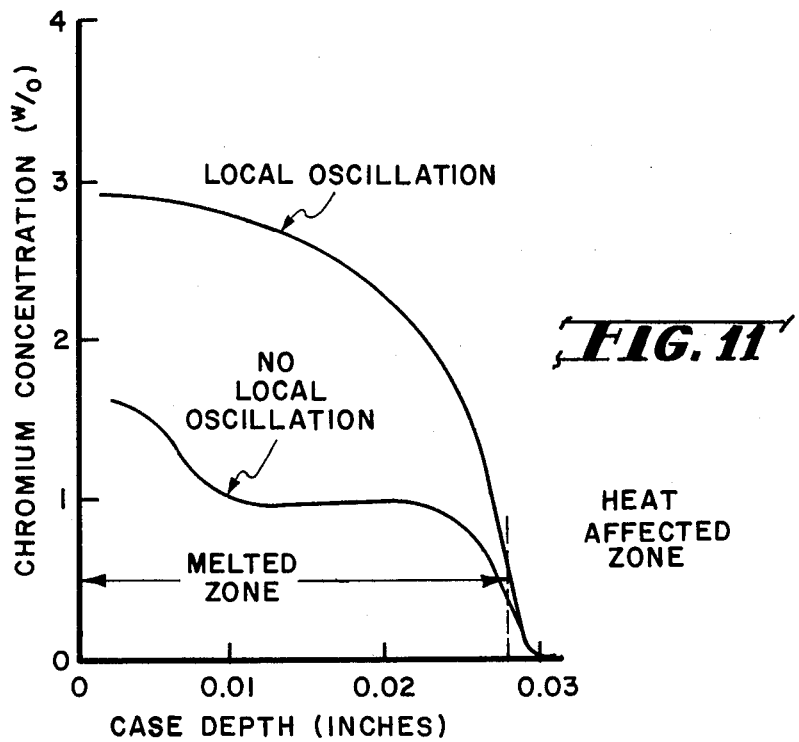
Figure 12:
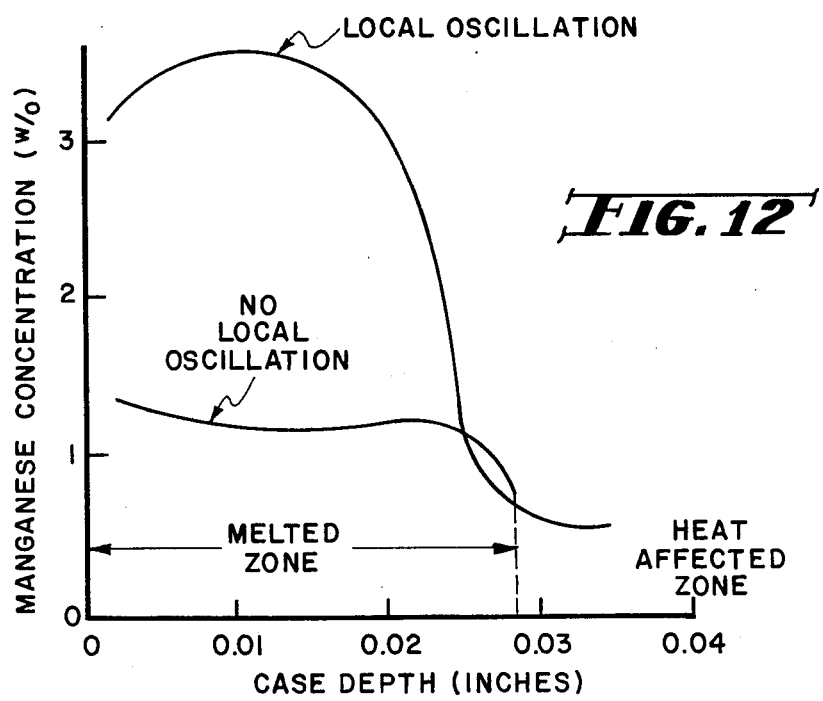

FIGS. 11 and 12 show minor alloy ingredient profiles in the finished product for chromium and manganese respectively. The upper curves for chromium and manganese were obtained with local oscillation and the lower curves were obtained without local oscillation treatment.

Figure 13:
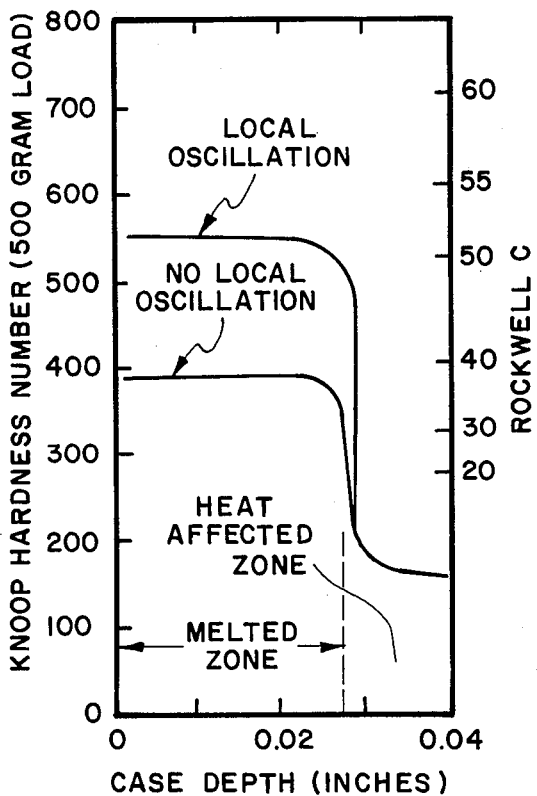

FIG. 13 shows hardness profiles in separate finished products subjected to laser working without local oscillaton and with local oscillation respectively. Laser working without local oscillation gives hardness values ranging between Rockwell C 27 to 44 and laser working with local oscillation gives hardness values ranging between Rockwell C 46 to 58, up to a depth of nearly 0.03 inches in both cases. The hardness value for the core of the steel was Rockwell B 93, and the hardness value for the heat affected zone was Rockwell B 90. The depth of the heat affected zone was approximately 0.05 inches.

EXAMPLE 3

The surface of AISI C 1018 plate was coated with a ¼ to ½ mil. layer of manganese phosphate by a commercial manganese phosphating process. A small portion of a mixture containing 10 grams of 45 micron-sized aluminum powder suspends in 50 milliliters of isopropyl alcohol was uniformly brushed on to the manganese phosphate surface. Aluminum powder coating was applied over the manganese phosphate coating to prevent gas evolution during melting. Then a mixture containing 22 grams of 45 micron-sized carbon powder, 20 grams of 10 micronsized chromium powder, and 8 grams of 45 micron-sized tungsten powder, suspended in 40 milliliters of isopropyl alcohol was sprayed 20 times uniformly over the aluminum powder coating. The thickness of the loosely packed metal powder coating was 25 to 30 mils. The surface of the steel containing the mixture of metal powder was scanned at 10 inches per minute under 12 kilowatts locally oscillated laser beam. The laser beam size was 0.1 inches by 0.5 inches in a rectangular configuration and being elongated perpendicular to the direction of traverse because of local oscillation being performed along this direction. The oscillation rate was 690 Hertz. The surface layer of the steel which was melted and resolidified was intimately alloyed with the carbon, chromium, tungsten, and aluminum powder.

Figure 14:
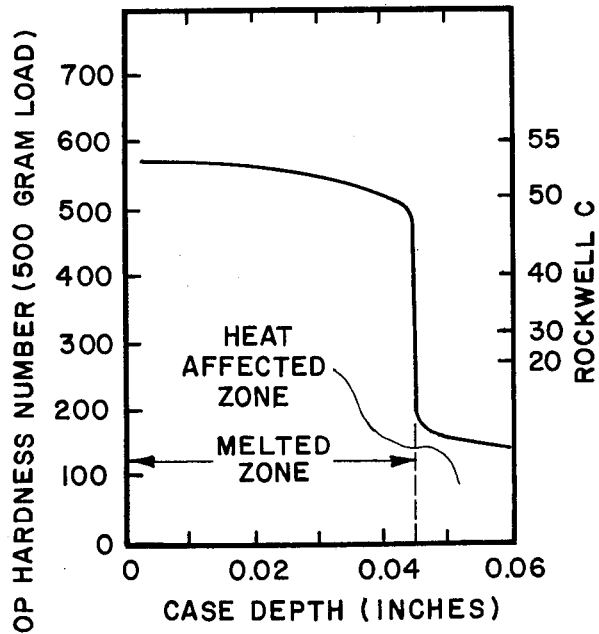

FIG. 14 shows hardness profile in the finished product subjected to laser working with local oscillation as described above in this Example 3. The melted zone was 44 mils deep and in this zone, the hardness was Rockwell C 48 to 53, while the hardness value for the core of the steel was Rockwell B 93, and the hardness value for the heat affected zone was Rockwell B 90. The depth of the heat affected zone was approximately 0.12 inches.

EXAMPLE 4

Th surface of a grey cast iron part containing approximately 0.2 weight percent chromium was coated with a ¼ to ½ mil layer of manganese phosphate by a commercial manganese phosphating process. Then a mixture containing 5 grams of 10 micron-sized chromium powder suspended in 40 milliliters of isopropyl alcohol was sprayed 10 times uniformly over the manganese phosphate coating. The thickness of the loosely packed metal powder coating was ½ to 1 mil. The surface of the cast iron part containing chromium powder was scanned at 30 inches per minute under an 11 kilowatt locally oscillated laser beam. The laser beam size was 0.1 inches by 0.5 inches in a rectangular configuration and being elongated perpendicular to the direction of traverse because of local oscillations being performed along this direction. The oscillation rate was 690 Hertz. Thus, the surface of the cast iron part melted and intimately alloyed with the chromium powder.

Figure 15:
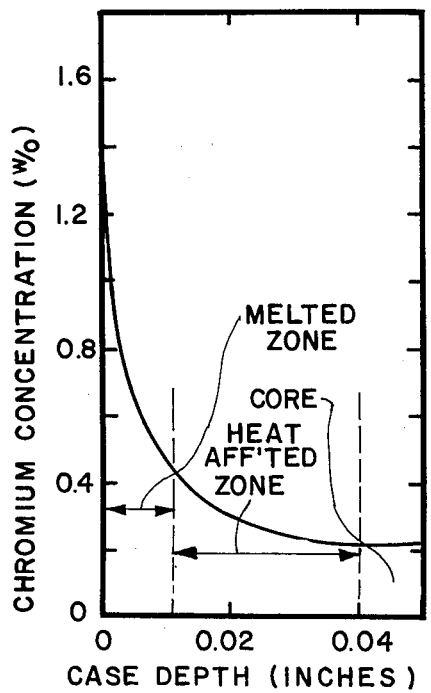

FIG. 15 shows minor alloy ingredient concentration in the finished product for chromium. The curve is fitted to original data points (not shown) in accordance with conventional statistical practice. This curve shows an increase in the concentration of chromium in the melted zone which is 10 mils deep.

Figure 16:
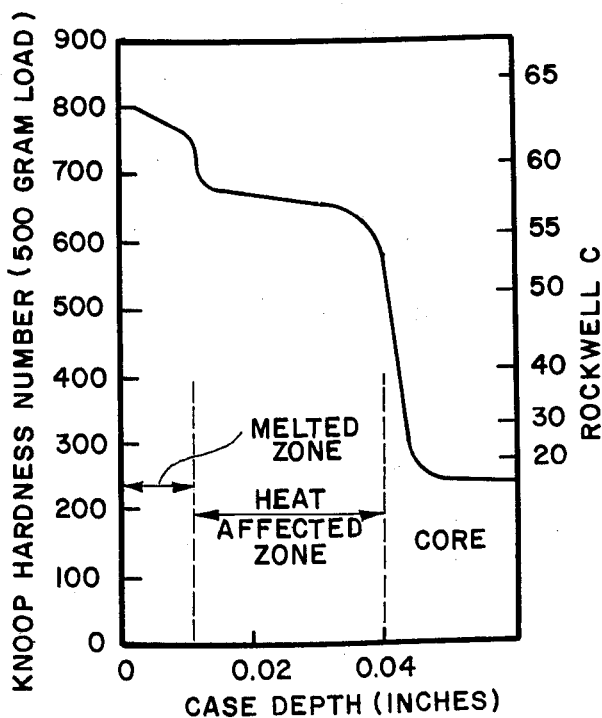

FIG. 16 shows hardness profiles in the finished product subjected to laser working with local oscillation. In the melted zone, the hardness was Rockwell C60 to 65 while the hardness value for the cast iron part which was not subjected to laser working was Rockwell B95. The hardness value of the heat affected zone was Rockwell C 56 to 61.

EXAMPLE 5

The surface of a grey cast iron plate was coated with a ¼ to ½ mil layer of manganese phosphate by a commerical manganese phosphating process. Then a mixture containing 3 grams of 10 micron-sized chromium powder and 5 grams of 45 micron-sized silicon powder suspended in 40 milliliters of isopropyl alcohol was sprayed five times uniformly over the manganese phosphate coating. The thickness of the loosely packed metal powder coating was ½ to 1 mil. The cast iron part containing chromium and silicon powder was preheated to 759° F in a furnace, and then its surface was scanned at 60 inches per minute under a 6 kilowatt locally oscillated laser beam. The laser beam size was 0.5 inches by 0.5 inches. The oscillation rate was 690 Hertz perpendicular to direction of traverse and 125 Hertz along direction of traverse. Under these conditions the surface of the cast iron part melted and intimately alloyed with the chromium and silicon powder.

Figure 17:
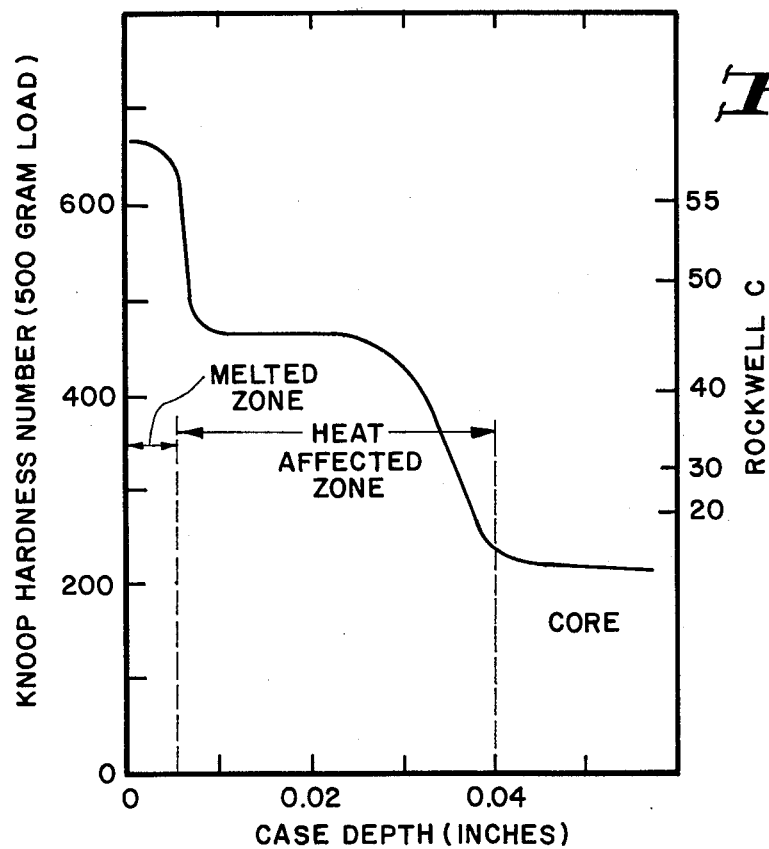

FIG. 17 shows hardness profiles in the finished product subjected to laser working with local oscillation. The melted zone was about 5 mils deep and the hardness in this zone was Rockwell C 56 to 60 while the hardness value for the cast iron part which was not subjected to laser working was Rockwell B 95. The hardness in the heat affected zone was Rockwell C 45.

EXAMPLE 6

The surface of a grey cast iron plate was coated with a ¼ to ½ mil layer of manganese phosphate by a commercial manganese phosphating process. Then a mixture containing 5 grams of 10 micron-sized chromium powder suspended in 40 milliliters of isopropyl alcohol was sprayed five times uniformly over the manganese phosphate coating. The thickness of the loosely packed metal powder coating was ½ to 1 mil. The surface of the cast iron part containing chromium powder was scanned at 30 inches per minute under an 8 kilowatt locally oscillated laser beam. The laser beam size was 0.5 inches by 0.5 inches. The oscillation rate was 690 Hertz perpendicular to direction of traverse and 125 Hertz along direction of traverse. Under these conditions, the surface of the cast iron part melted and intimately alloyed with the chromium powder.

Figure 18:
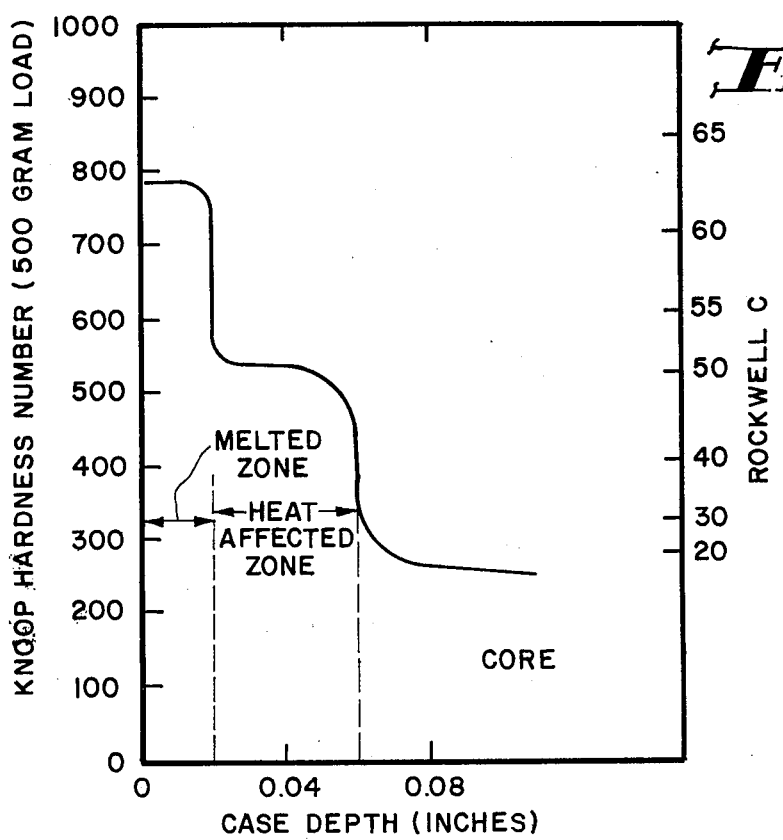

FIG. 18 shows the hardness profiles in the finished product subjected to laser working with local oscillation. The melted zone was 10 mils deep and the hardness in this zone was Rockwell C 58 to 67 while the hardness value for the cast iron part which was not subjected to laser working was Rockwell B 98. hardness in the heat affected zone was Rockwell C 51.

EXAMPLE 7

The surface of AISI 4815 plate was coated with a ¼ to ½ mil layer of manganese phosphate by a commercial manganese phosphating process. 10 micron-sized chromium powder was uniformly sprinkled over the manganese phosphate coating and the metal powder was compacted. The depth of the densely compacted chromium powder coating was approximately 0.025 inches. 45 micron-sized carbon powder was uniformly sprinkled over the chromium powder coating and the carbon powder was compacted. The depth of the densely compacted carbon powder coating was approximately 0.01 inches. The steel plate containing carbon and chromium powder was preheated to 900° F, and then its surface was scanned at 9 inches per minute under a 14 kilowatt locally oscillated laser beam, using a gas shield composed of argon flowing at 7 cubic feet per hour and hydrogen flowing at 2 cubic feet per hour. The laser beam size was 0.1 inches by 0.5 inches in a rectangular configuration and being elongated perpendicular to the direction of traverse because of local oscillation being performed along this direction. The oscillation rate was 690 Hertz. Under these conditions, the surface of the steel plate melted and intimately alloyed with the carbon and chromium powder. Immediately after laser working, the steel plate was post heated at 900° F for ½ hour. The preheating and post heating were performed in a furnace and these treatments eliminated cracking of the melted zone.

Figure 19:
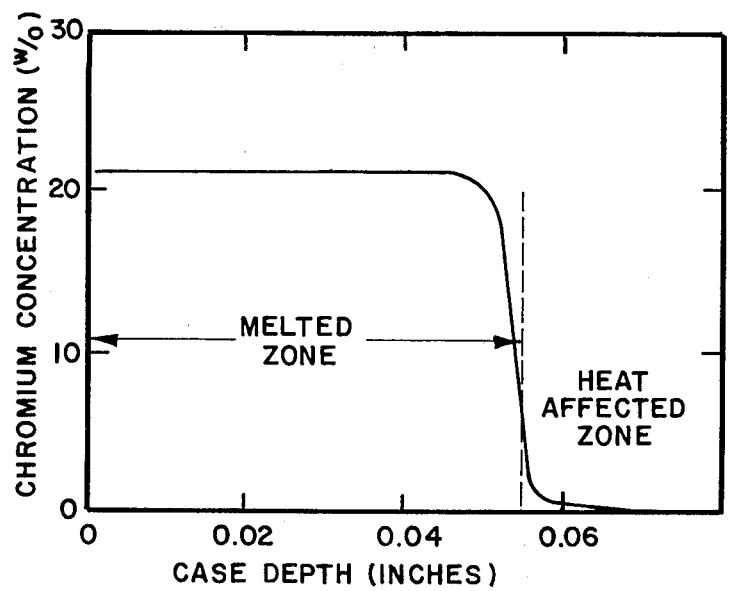

FIG. 19 shows minor alloy ingredient concentration in the finished product for chromium. The curve is fitted to original data points (not shown) in accordance with conventional statistical practice. This curve shows a substantial increase in the concentration of chromium in the melted zone which is 50 mils deep. The concentration of chromium was 21 weight percent up to a depth of 50 mils.

Figure 20:
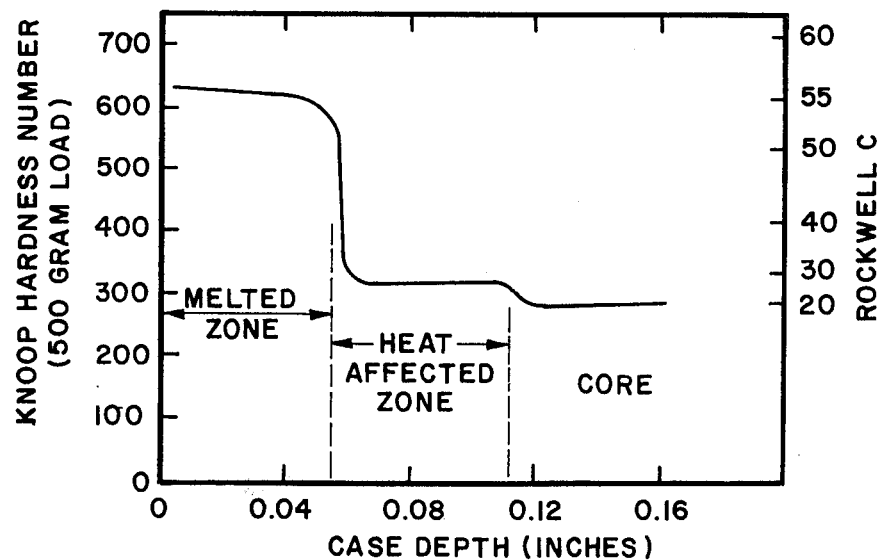

FIG. 20 shows hardness profiles in the finished project subjected to laser working with local oscillation. In the melted zone, the hardness was Rockwell C 53 to 57 while the hardness value for the steel plate which was not subjected to laser working was Rockwell C 20. The hardness in the heat affected zone was Rockwell C 30.

Figure 21:
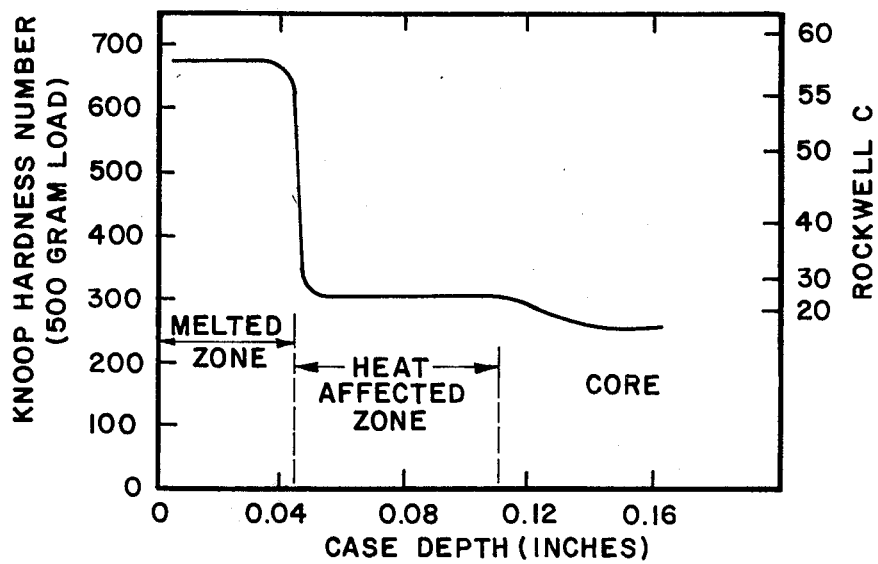

FIG. 21 shows hardness profiles in the finished product subjected to laser working with local oscillation and further subjecting the laser worked steel plate to a furnace heat treatment at 1200° F for 2 hours and air-cooling at the conclusion of heat treatment. In the melted zone, the hardness was Rockwell C 55 to 58. The hardness in the heat affected zone was Rockell C 25. The curve in FIG. 21 indicates the resistance of the melted zone to high temperature tempering.

SURFACE ALLOYING OF VALVES

A particular application of the process of the invention relates to automobile and truck engine inlet and exhaust valves controlling exhaust from the engine to the exhaust system and controlling air/fuel inlet mixture. The valve head has an upper surface which seals against a downwardly facing valve seat an such a surface must maintain high temperature hardness. This is conventionally accomplished in the prior art by oxyacetelene weld applied hard facing alloy, costing about 40 cents per square inch of area surfaced.

In accordance with the present invention valves were surface alloyed to produce a smooth temper resistant casing 0.16 inches wide and 20 to 30 mil deep with a room temperature hardness of 50 Rockwell C. Removal of less than 10% of applied casing by surface grinding to finished size was required after forming the alloy, compared to the 50% or more alloy removal entailed in oxyacetelene weld hard facing.

Figure 22:
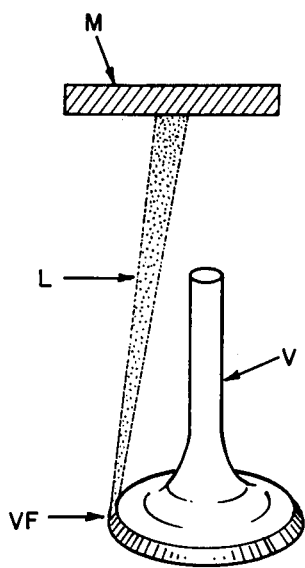
FIG. 22 is a schematic isometric view of an automative engine inlet or exhaust valve being processed in accordance with the present invention.

The substrate valve was an iron alloy containing 20–23 weight percent chromium, 6–10% manganese, 1.5–4.5% nickel, less than 1% silicon, 0.5–0.7% carbon, 0.2–0.5% nitrogen, less than 0.55 sulphur and less than .045 of phosphorous. The diameter of the valve was 1.2 inches and the area of valve facing to be surface alloyed was 0.61 square inches. The optics module of the laser system comprised an f/21 telescope with a nutating mirror in the telescope system and the arrangement of mirror M, laser beam L, valve V, and valve face VF, for working is shown in FIG. 22. The mirror had a nutating motion so that the beam was scanned around the circular valve face trace, rather than rotating the valve past the stationary beam. This avoided centrifugation of the molten surface layer. Relative motion of beam and valve facing was conducted at a speed of about 200 inches per minute, under which condition it would be possible to process 2400 valves per hour.

Before being subjected to laser treatment, the valves were coarse ground almost to finish size, dip-coated in a slurry containing 20 weight percent chromium and 80 weight percent tungsten powder, suspended in isopropyl alcohol, to produce a coating of 0.5 mm. The valves were preheated to 50° C. to evaporate the alcohol essentially immediately upon dip-coating. The chromium powder was 10 microns average diameter and the tungsten was 44 microns average diameter. The powder-coated valves were supported on a copper jig to enhance heat sinking and laser processed as described above in the preceding examples using 3–19 kilowatts of laser power in 1–30 seconds. Shielding gases were applied during laser processing. Processing conditions and results are tabulated in table I below.

TABLE I

Processing Conditions for Surface Alloying Valves with Chromium and Tungsten

| Telescope System | Processing Time per Valve (second) | Ramp up (sec.) | Ramp Down (sec.) | Laser Output Power (KW) | Scanning Speed (in/min) | Shielding Gas |
|---|---|---|---|---|---|---|
| Nutating f/21 | 1.4 | 0.2 | 0.3 | 19 | 205 | Helium |
| Nutating f/21 | 3.2 | 0.2 | 0.2 | 10 | 75 | Argon & Hydrogen |
| Stationary f/21 | 27 | 0.2 | 3.0 | 3 | 9.5 | Argon & Hydrogen |

A hardness profile was obtained which was between 550 and 600 Knoop (500 gram load) to a depth of 52 mils and below such depth, was 400. The hardness of the alloyed zone did not decrease after tempering at 1000° F(540° C) for 2 hours.

It was found that during surface alloying, the beginning and end of the circular trace, in overlapping, lead to progressive heat buildup and undesired excessive melting leading to surface roughness on the alloyed surface. This problem is overcome by adjusting the CW laser output power such that heat input is gradually reduced downwards the end of processing. This may, optionally and preferably, be combined with gradual decrease of power. A schedule of ramping up from 0 power to 19 kilowatts in 0.2 seconds, tracing at 19 kilowatts nominal full power until 0.9 seconds and then ramping down over a period of 0.3 seconds from start to finish of the circular trace was a suitable schedule overcoming the foregoing problems. A smooth alloyed surface would be obtained. The general principle involved is a ramping down of power towards the finish of the trace back to the origin of the trace.

Figure 23:
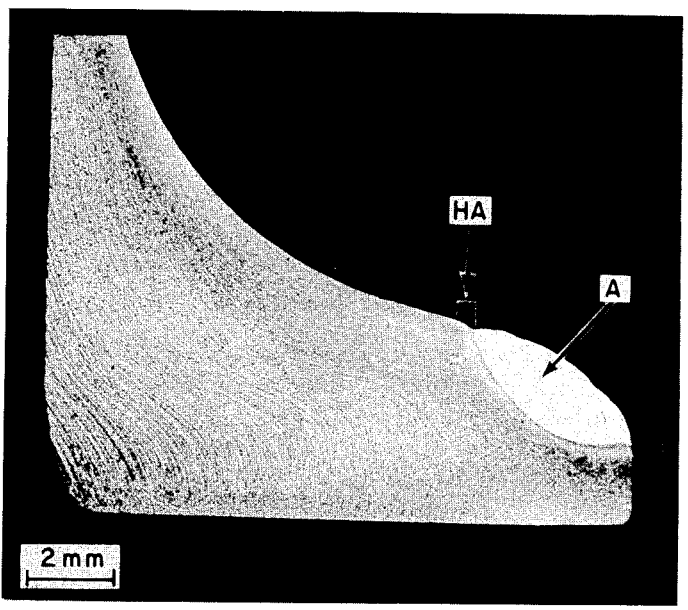
FIG. 23 is a photomicrograph of a portion of the cross-section of the valve showing the surface alloyed region.

A cross section photomicrograph of such a valve is shown in FIG. 23. The alloy layer is indicated at A and heat affected substrate underlayer at HA.

Figure 24:
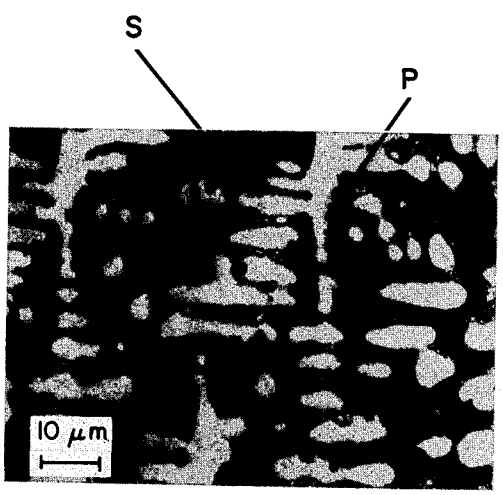
FIGS. 24 and 25 are 1000× magnified cross-section photomicrographs of a portion of a resultant product without and with further heat treatment.
Figure 25:
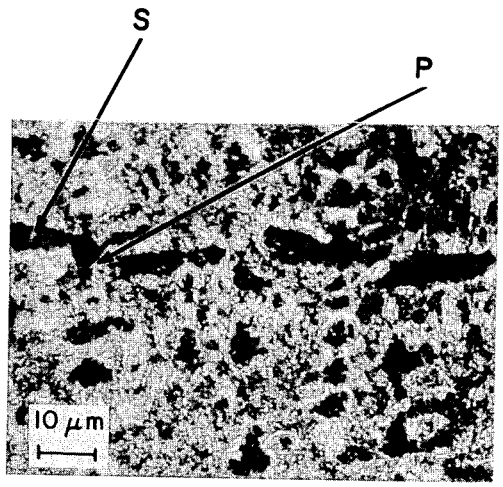

FIGS. 24 and 25, 1000× magnified photomicrographs, are taken as polished cross-sections of the alloy casing produced in accordance with Example 7 above with FIG 24 showing the alloy as laser processed in accordance with said example and FIG. 25 shows the casing after furnace heat treating the part at 1900° F (1040° C) for 4 hours and oil quenching. Primary dendrites (running orthogonal to the surface layer) are indicated at P and secondary dendrites (running parallel to the surface and branching from the primary dendrites) are indicated at S. In FIGS. 24 and 25, the secondary dendrite spacing (center-to-center) as viewed in the polished cross-section plane, is about 10–15 microns.

There is a sharp differential of composition between the dendrites and inter-dendritic eutectic carbide matrix in the as-laser processed product (FIG. 24) which is substantially resolved in the heat treated product (FIG. 25) to increase hardness and wear resistance of the latter.

There have been described then, surface modification methods, apparatus and resultant products meeting the foregoing objects. The time of processing is very short and space, equipment and cost burdens are low. The distrubance of underlying substrate properties is minimal. Alloys and other mixtures are formed by introducing minority alloying or mixture components into the substrate. The resultant surface layer casing may be single phase or multi-phase as described above in connection with FIGS. 6A–6D. The casing may be areally continuous within its areal outline or discontinuous therein. The casing will, in most instances, comprise a concentration gradient of minority ingredients decreasing towards the underlying substrate but having areal compositional uniformity at any given depth within said gradient.

The invention is applicable to ferrous metals and alloys including all types of cast iron and all types of steel. It can also be applied to non-ferrous metals and alloys. The element or elements to be alloyed on the surface of the metallic product may be applied as a powder or a mixture of powders or an alloyed powder or any suitable combination of the above.

The invention may be applied to mixing non-metallic materials and to mixing of metallic and non-metallic materials in a substrate surface layer or to physical modification of a substrate surface layer by mixing in only such minority gradient as may be available from a surrounding gas phase or other minor source or without mixing in minority ingredients at all. As used herein "gas phase" includes sols and molecular beams in vacuum as well as pure gases at atmospheric, sub-atmostpheric and superatmospheric pressures.

The minority ingredients introduced into the mixed surface layer may be reacted with the matrix phase during melting and mixing and/or may be reacted with the underlying substrate after melting, volatilized or leached from the surface layer after the melting step, or subjected to other post-melting treatments, known per se, to further modify the properties of cased product.

Clearly, the invention is not limited to achieving alloying or a chemical reaction of the surface layer by means of a single pass of the laser heat source over the workpiece. After the first pass, additional alloying or reaction material may be added to the substrate and additional heat added in the manner described to further modify the surface layer in the manner heretofore described.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Surface layer production method comprising,
coating metal substrate with a coating layer comprising desired alloying ingredients,
relatively scanning a continuous wave laser beam of 1–20 kilowatts focused to a 0.025 to 0.7 inch diameter circle or area equivalent of other form over the coated surface in a linear trace at a rate of 5–500 inches per minute to melt the coating and a predetermined depth and width of the substrate surface along said linear trace and forcibly intermix the melted substrated layer and the entirety of the coating through mass transfer predominant over any diffusion mixing and rapidly cooling to produce a solid alloy casing and a substantial weight per cent of which is obtained from the substrate along said linear trace of the produced alloy composition throughout said predetermined depth,
the depth of melting being selected in relation to amount of minority alloying ingredients and the tine of residence in molten state and cooling rate and heat transfer conditions at said layer being controlled to produce a desired alloy composition and so that the secondary dendrite spacing of said alloy is 1–100 microns.

2. Method in accordance with claim 1 wherein a single linear trace of relative scan between substrate and laser beam is made.

3. Method in accordance with claim 1 wherein the laser beam is deflected.

4. Method in accordance with claim 1 wherein the substrate is scanned past the relatively static laser beam.

5. Method in accordance with claim 1 wherein the linear scan is along a closed loop path.

6. Method in accordance with claim 5 wherein power is ramped down at closing of the loop to prevent local heat buildup at the overlap of linear scan begin and completion.

7. Method is accordance with claim 1 wherein the alloyed layer depth is from 2–200 mils.

8. Method in accordance with claim 1 wherein the laser beam is locally oscillated at 100–1000 Hertz to promote mixing during said linear scan.

9. Surface layer production method in accordance with claim 1 wherein said casing has homogeneity of chemical composition and fine grain structure throughout its depth.

* * * * *